United States Patent
Klingbeil (10) Patent No.: US 12,359,633 B2
(45) Date of Patent: Jul. 15, 2025

(54) METHOD FOR OPERATING AN ENGINE

(71) Applicant: Transportation IP Holdings, LLC, Norwalk, CT (US)

(72) Inventor: Adam Edgar Klingbeil, Ballston Lake, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 63 days.

(21) Appl. No.: 18/152,051

(22) Filed: Jan. 9, 2023

(65) Prior Publication Data
US 2023/0160350 A1 May 25, 2023

Related U.S. Application Data

(63) Continuation-in-part of application No. 17/450,976, filed on Oct. 14, 2021, now Pat. No. 11,578,684, which is a continuation-in-part of application No. 15/013,432, filed on Feb. 2, 2016, now abandoned, which is a continuation-in-part of application No.
(Continued)

(51) Int. Cl.
*F02D 19/08* (2006.01)
*F02D 19/06* (2006.01)
*F02D 41/00* (2006.01)

(52) U.S. Cl.
CPC ......... *F02D 19/081* (2013.01); *F02D 19/061* (2013.01); *F02D 19/0644* (2013.01); *F02D 41/005* (2013.01); *F02D 2200/0802* (2013.01); *F02D 2200/101* (2013.01); *F02D 2200/70* (2013.01)

(58) Field of Classification Search
CPC .. F02D 19/081; F02D 19/061; F02D 19/0644; F02D 41/005; F02D 2200/0802; F02D 2200/101; F02D 2200/70
USPC ........................................................ 701/103
See application file for complete search history.

(56) References Cited

U.S. PATENT DOCUMENTS

| 4,402,212 A | 9/1983 | Childs |
| 4,495,930 A | 1/1985 | Nakajima |
| 5,370,097 A | 12/1994 | Davis |
| (Continued) | | |

FOREIGN PATENT DOCUMENTS

| CN | 1639452 A | 7/2005 |
| CN | 1701169 A | 11/2005 |
| (Continued) | | |

OTHER PUBLICATIONS

Mellde, R. et al., "Advanced Automobile Engines for Fuel Economy, Low Emissions, and Multifuel Capability," Annual Review of Energy, vol. 14, Nov. 1989, 20 pages.
(Continued)

*Primary Examiner* — Kurt Philip Liethen
*Assistant Examiner* — John D Bailey
(74) *Attorney, Agent, or Firm* — K&L Gates LLP (57) ABSTRACT

Systems and methods for controlling fuel factions delivered to different cylinders are provided. In one example, a controller is configured to, during a single engine cycle and responsive to a first condition, deliver a lower fraction of a first fuel into a donor cylinder in comparison to a fraction of the first fuel being injected into a non-donor cylinder and deliver a higher fraction of a second fuel into the donor cylinder in comparison to a fraction of the second fuel being injected into the non-donor cylinder.

18 Claims, 4 Drawing Sheets

Related U.S. Application Data

13/484,621, filed on May 31, 2012, now Pat. No. 9,249,744.

(56) References Cited

U.S. PATENT DOCUMENTS

| | | |
|---|---|---|
| 5,560,326 A | 10/1996 | Merritt |
| 5,642,705 A | 7/1997 | Morikawa et al. |
| 5,713,328 A | 2/1998 | Anderson et al. |
| 5,875,743 A | 3/1999 | Dickey |
| 5,890,459 A | 4/1999 | Hedrick et al. |
| 5,911,210 A | 6/1999 | Flach |
| 6,101,986 A | 8/2000 | Brown et al. |
| 6,230,683 B1 | 5/2001 | zur Loye et al. |
| 6,276,334 B1 | 8/2001 | Flynn et al. |
| 6,286,482 B1 | 9/2001 | Flynn et al. |
| 6,463,907 B1 | 10/2002 | Hiltner |
| 6,543,395 B2 | 4/2003 | Green |
| 6,659,071 B2 | 12/2003 | LaPointe et al. |
| 6,907,870 B2 | 6/2005 | zur Loye et al. |
| 6,912,992 B2 | 7/2005 | Ancimer et al. |
| 6,915,776 B2 | 7/2005 | zur Loye et al. |
| 6,951,202 B2 | 10/2005 | Oda |
| 7,019,626 B1 | 3/2006 | Funk |
| 7,107,942 B2 | 9/2006 | Weissman |
| 7,387,091 B2 | 6/2008 | Ritter |
| 7,503,312 B2 | 3/2009 | Surnilla et al. |
| 7,533,634 B2 | 5/2009 | Ritter et al. |
| 7,549,408 B2 | 6/2009 | Russell |
| 7,556,030 B2 | 7/2009 | Ashida et al. |
| 7,640,913 B2 | 1/2010 | Blumberg et al. |
| 7,740,000 B2 | 6/2010 | He et al. |
| 7,861,518 B2 | 1/2011 | Federle |
| 7,913,664 B2 | 3/2011 | Williams et al. |
| 7,983,831 B2 | 7/2011 | Tsunooka |
| 8,006,677 B2 | 8/2011 | Williams et al. |
| 8,032,294 B2 | 10/2011 | Loeffler et al. |
| 8,037,850 B2 | 10/2011 | Pursifull |
| 8,402,939 B2 | 3/2013 | Reuss et al. |
| 8,555,702 B2 | 10/2013 | Sgatti et al. |
| 8,584,657 B2 | 11/2013 | Yagi et al. |
| 8,733,298 B2 | 5/2014 | Haskara et al. |
| 8,831,858 B2 * | 9/2014 | Roth ............... F02M 26/50 701/104 |
| 8,893,691 B2 | 11/2014 | Payne et al. |
| 8,903,632 B2 | 12/2014 | Peters et al. |
| 8,931,255 B2 | 1/2015 | Wilson |
| 9,027,538 B2 | 5/2015 | Lepley |
| 9,334,841 B1 | 5/2016 | Jackson et al. |
| 2002/0007816 A1 | 1/2002 | Zur Loye et al. |
| 2002/0020388 A1 | 2/2002 | Wright et al. |
| 2003/0037978 A1 | 2/2003 | Hofbauer |
| 2003/0213449 A1 | 11/2003 | Bloms et al. |
| 2003/0221661 A1 | 12/2003 | Willi et al. |
| 2004/0103860 A1 | 6/2004 | zur Loye et al. |
| 2004/0123849 A1 | 7/2004 | Bryant |
| 2004/0177837 A1 | 9/2004 | Bryant |
| 2004/0182378 A1 | 9/2004 | Oshimi et al. |
| 2005/0121005 A1 | 6/2005 | Edwards |
| 2005/0205021 A1 | 9/2005 | Schute |
| 2006/0032477 A1 | 2/2006 | May |
| 2006/0102145 A1 | 5/2006 | Cohn et al. |
| 2006/0180121 A1 | 8/2006 | Wickman et al. |
| 2007/0079647 A1 | 4/2007 | Aoyama |
| 2007/0095331 A1 | 5/2007 | Ayame |
| 2007/0119425 A1 | 5/2007 | Lewis et al. |
| 2007/0137514 A1 | 6/2007 | Kumar et al. |
| 2007/0295316 A1 | 12/2007 | Davis et al. |
| 2008/0053399 A1 | 3/2008 | Bromberg et al. |
| 2008/0098726 A1 | 5/2008 | Donaldson et al. |
| 2008/0103676 A1 | 5/2008 | Ancimer et al. |
| 2008/0110161 A1 | 5/2008 | Persson |
| 2008/0121136 A1 | 5/2008 | Mari et al. |
| 2008/0262701 A1 | 10/2008 | Williams |
| 2009/0029244 A1 | 1/2009 | Asahina et al. |
| 2009/0025695 A1 | 6/2009 | Wolber et al. |
| 2009/0271090 A1 | 10/2009 | Sumilla et al. |
| 2010/0012058 A1 | 1/2010 | Hu |
| 2010/0030448 A1 | 2/2010 | Roth et al. |
| 2010/0162678 A1 | 7/2010 | Annigeri et al. |
| 2010/0299049 A1 | 11/2010 | Kang et al. |
| 2011/0015856 A1 | 1/2011 | Arnold |
| 2011/0079197 A1 | 4/2011 | Stewart et al. |
| 2011/0088654 A1 | 4/2011 | Courtoy et al. |
| 2011/0113774 A1 | 5/2011 | Nunn et al. |
| 2011/0114058 A1 | 5/2011 | Cohn et al. |
| 2011/0118914 A1 | 5/2011 | Brooks et al. |
| 2011/0132285 A1 | 6/2011 | Pursifull |
| 2011/0132286 A1 | 6/2011 | Leone et al. |
| 2011/0132323 A1 | 6/2011 | Sumilla et al. |
| 2011/0137470 A1 | 6/2011 | Sumilla et al. |
| 2011/0184629 A1 | 7/2011 | Krengel et al. |
| 2011/0209459 A1 | 9/2011 | Hancu et al. |
| 2011/0253113 A1 | 10/2011 | Roth et al. |
| 2011/0264355 A1 | 10/2011 | Iwatani et al. |
| 2011/0283684 A1 | 11/2011 | Aso et al. |
| 2011/0283959 A1 | 11/2011 | Aso et al. |
| 2011/0288738 A1 | 11/2011 | Donnelly et al. |
| 2012/0004830 A1 | 1/2012 | Miyagawa et al. |
| 2012/0004831 A1 | 1/2012 | Miyagawa et al. |
| 2012/0210988 A1 | 8/2012 | Willi |
| 2012/0298070 A1 | 11/2012 | Akinyemi et al. |
| 2012/0323465 A1 | 12/2012 | Peters et al. |
| 2012/0323470 A1 * | 12/2012 | Klingbeil ............... F02M 26/50 701/108 |
| 2012/0325180 A1 | 12/2012 | Montgomery |
| 2013/0000614 A1 | 1/2013 | Freund et al. |
| 2013/0030672 A1 | 1/2013 | Klingbeil et al. |
| 2013/0054116 A1 * | 2/2013 | Lepley ............... F02D 41/0025 701/104 |
| 2013/0133616 A1 | 5/2013 | Klingbeil |
| 2013/0158752 A1 | 6/2013 | Norton |
| 2013/0283766 A1 * | 10/2013 | Primus ............... F02D 41/0055 60/272 |
| 2013/0289849 A1 | 10/2013 | Uehara et al. |
| 2013/0311066 A1 * | 11/2013 | Guimaraes ......... F02D 41/3094 701/104 |
| 2014/0261345 A1 | 9/2014 | Bromberg et al. |
| 2014/0278011 A1 | 9/2014 | Geckler et al. |
| 2015/0198070 A1 | 7/2015 | Record et al. |
| 2015/0240738 A1 * | 8/2015 | Yerace ................. F02D 19/105 123/27 GE |
| 2015/0275781 A1 | 10/2015 | Matar et al. |
| 2016/0069286 A1 | 3/2016 | Zielinski et al. |
| 2016/0069287 A1 * | 3/2016 | Lavertu ................ F02D 41/005 701/103 |
| 2016/0069301 A1 | 3/2016 | Karunaratne et al. |
| 2016/0108873 A1 * | 4/2016 | Jackson ............... F02D 41/0082 123/445 |
| 2016/0138526 A1 | 5/2016 | Peters et al. |
| 2016/0169141 A1 * | 6/2016 | Flynn ................. F02D 19/0623 701/102 |
| 2016/0169142 A1 * | 6/2016 | Klingbeil ............ F02D 19/0692 123/435 |
| 2016/0230712 A1 * | 8/2016 | Akinyemi ........... F02D 41/0065 |
| 2016/0252027 A1 * | 9/2016 | Jackson ............... F02D 19/0694 60/605.2 |
| 2016/0281615 A1 * | 9/2016 | Flynn ................. F02D 41/0025 |
| 2016/0333807 A1 * | 11/2016 | Pathan .................. G01M 15/11 |
| 2017/0314481 A1 | 11/2017 | Karunaratne et al. |
| 2019/0257253 A1 * | 8/2019 | Klingbeil ............ F02D 19/0642 |

FOREIGN PATENT DOCUMENTS

| | | |
|---|---|---|
| CN | 101201020 A | 6/2008 |
| CN | 102400797 A | 4/2012 |
| DE | 19922748 A1 | 11/2000 |
| DE | 102004051287 A1 | 4/2006 |
| DE | 102006020223 B3 | 8/2007 |
| DE | 102010036131 A1 | 3/2012 |
| EP | 2336529 A2 | 6/2011 |
| JP | 2000145488 A | 5/2000 |
| JP | 2004108153 A | 4/2004 |
| JP | 2008274954 A | 11/2008 |

(56) References Cited

FOREIGN PATENT DOCUMENTS

| | | |
|---|---|---|
| JP | 2010065604 A | 3/2010 |
| RU | 2136918 C1 | 9/1999 |
| WO | 9421911 A1 | 9/1994 |
| WO | 03076788 A1 | 9/2003 |
| WO | 2011128692 A1 | 10/2011 |
| WO | 2011153069 A1 | 12/2011 |

OTHER PUBLICATIONS

Kessels, J. et al., "Integrated Energy & Emission Management for Hybrid Electric Truck with SCR aftertreatment," Proceedings of the 2010 IEEE Vehicle Power and Propulsion Conference, Sep. 1, 2010, Lille, France, 6 pages.

Qian, D. et al., "Research of the Influence of Combustion Chamber Structure on Performance of Dual Fuel Engine," Proceedings of the 2011 International Conference on Electric Information and Control Engineering, Apr. 15, 2011, Wuhan, China, 3 pages.

ISA European Patent Office, International Search Report Issued in Application No. PCT/US2012/064929, Mar. 6, 2013, WIPO, 4 pages.

ISA European Patent Office, Written Opinion of the International Searching Authority Issued in Application No. PCT/US2012/064929, Mar. 6, 2013, WIPO, 5 pages.

United States Patent and Trademark Office, Office Action Issued in U.S. Appl. No. 13/328,438, filed Jun. 19, 2013, 10 pages.

ISA European Patent Office, International Search Report Issued in Application No. PCT/US2013/047501, Nov. 6, 2013, WIPO, 4 pages.

ISA European Patent Office, Written Opinion of the International Searching Authority Issued in Application No. PCT/US2013/047501, Nov. 6, 2013, WIPO, 8 pages.

Great Britain Intellectual Property Office, Combined Search and Examination Report under Sections 17 and 18(3) Issued in Application No. GB1309361.2, Nov. 25, 2013, 7 pages.

United States Patent and Trademark Office, Office Action Issued in U.S. Appl. No. 13/551,748, filed Aug. 1, 2014, 15 pages.

United States Patent and Trademark Office, Office Action Issued in U.S. Appl. No. 14/251,726, filed Jan. 23, 2015, 8 pages.

United States Patent and Trademark Office, Office Action Issued in U.S. Appl. No. 13/551,748, filed Jan. 26, 2015, 24 pages.

United States Patent and Trademark Office, Notice of Allowance Issued in U.S. Appl. No. 13/551,748, filed Jun. 16, 2015, 18 pages.

United States Patent and Trademark Office, Office Action Issued in U.S. Appl. No. 14/251,726, filed Aug. 15, 2015, 14 pages.

State Intellectual Property Office of the People's Republic of China, Office Action and Search Report Issued in Application No. 201280062097.8, Nov. 13, 2015, 19 pages. (Submitted with Partial Translation).

State Intellectual Property Office of the People's Republic of China, Office Action and Search Report Issued in Application No. 201310211815.X, Jun. 29, 2016, 23 pages. (Submitted with Partial Translation).

\* cited by examiner

FIG. 4

METHOD FOR OPERATING AN ENGINE

CROSS REFERENCE TO RELATED APPLICATIONS

This application is a continuation-in-part of U.S. patent application Ser. No. 17/450,976, entitled "METHOD FOR OPERATING AN ENGINE," and filed on Oct. 14, 2021, which is a continuation-in-part of U.S. patent application Ser. No. 15/013,432, filed Feb. 2, 2016, and entitled METHOD FOR OPERATING AN ENGINE. U.S. patent application Ser. No. 15/013,432 is a continuation-in-part of U.S. patent application Ser. No. 13/484,621, filed May 31, 2012, and entitled METHOD FOR OPERATING AN ENGINE. The contents of each of the above-identified application are incorporated herein by reference in their entirety.

BACKGROUND

Technical Field

Embodiments of the invention relate to a system and method for operating an engine, and the introduction of a plurality of fuels into the engine.

Discussion of Art

Internal combustion engines have been used in many fields, such as vehicles, due to high power-to-weight ratios together with high fuel energy density. Some engines can be modified to burn a plurality of fuels, such as both natural gas and diesel fuels, which is referred to as dual fuel or multi-fuel operation.

During some types of multi-fuel operation, a first fuel may be premixed with an intake air, and then the mixture is introduced into engine cylinders during intake strokes thereof. Subsequently, compression strokes of the engine cylinders start and proceed to increase pressure and temperature of the mixture. At the end of the compression strokes, a second fuel is delivered into the engine cylinders to ignite the mixture of the intake air and the first fuel so as to trigger combustion in the engine cylinders.

The first fuel may be different than the second fuel via at least a carbon content thereof. As a result, the usage of a lower carbon content fuel can reduce the emissions of the pollutants, such as nitrogen oxides ($NO_x$), carbon monoxide (CO), carbon dioxide ($CO_2$), and particulate matter (PM). However, when the operation of such engines is switched from a steady state to an increased load state, such as a transient acceleration state, the quantity and substitution rate of the fuels may be changed. For example, if the first fuel is natural gas and the second fuel is diesel, the substitution rate may be increased such that the amount of natural gas to diesel is relatively increased to provide desirable power while still providing desired environmental benefits. This results in reduction of the air fuel ratio (AFR) and may cause the auto-ignition of the premixed natural gas accordingly. The auto-ignition of the premixed natural gas may cause detonation or knocking in the engine cylinders, thereby damaging the engine.

There have been attempts to reduce or avoid the detonation or knocking in the engine cylinders. For example, to enable the multi-fuel operation, the compression ratio of the engine cylinders may be reduced. This may result in reduction of the cycle efficiency of the engines and increased challenges during cold start. Alternatively, during the multi-fuel operation, the substitution of the natural gas to the diesel fuel may be reduced, which increases the harmful engine emissions and the fuel cost due to the increased quantity of the diesel fuel.

Additionally, sudden increases in load may result in increased temperature of an aftertreatment system. If the aftertreatment system has built up flammable substances (e.g., oil, unburned fuel, or soot particles), uncontrolled combustion in the aftertreatment system may occur, thereby causing damage to the aftertreatment system.

Attempts to avoid uncontrolled oxidation in the aftertreatment have primarily looked to limiting the rate of load increase. However, this can result in degraded performance when fast load increase is desired. Therefore, there may be a need for methods of operation that differ from those that are currently available.

BRIEF DESCRIPTION

A method for operating an engine is provided in accordance with one embodiment of the invention. The method introduces a first fuel, a second fuel and an oxidant into a first engine cylinder and a second engine cylinder; monitoring a plurality of engine parameters; and adjusting a quantity of one of the first fuel, the second fuel, and the oxidant introduced to the first engine cylinder to be different from a quantity of one of the first fuel, the second fuel, and the oxidant introduced to the second engine cylinder based at least one of the plurality of monitored engine parameters.

A method for operating an engine is provided in accordance with another embodiment of the invention. The method introduces a first fuel, a second fuel and an oxidant into a first engine cylinder to operate the engine; monitoring a plurality of engine parameters; and increasing a quantity of the second fuel introduced in the first engine cylinder based on one of the plurality of monitored engine parameters; and reducing a quantity of the first fuel introduced in the first engine cylinder based on one of the plurality of monitored engine parameters in response to an increased load operation of the engine.

A method for operating an engine is provided in accordance with another embodiment of the invention. The method for operating an engine includes introducing a first fuel, a second fuel and an oxidant into a first engine cylinder set and a second engine cylinder set; monitoring a plurality of engine parameters; increasing a quantity of the second fuel and reducing a quantity of the first fuel in the first engine cylinder set in response to an increased load operation of the engine; and adjusting a quantity of one of the first fuel, the second fuel and the oxidant introduced to the second engine cylinder set to be different from a quantity of one of the first fuel, the second fuel, and the oxidant introduced to the first engine cylinder set.

A method for operating an internal combustion engine is provided in accordance with yet another embodiment of the invention. The method of operating an internal combustion engine, said internal combustion engine having a first cylinder set and a second cylinder set, the method comprises: introducing a first fuel, a second fuel, and an oxidant into the first cylinder set, thereby defining a first substitution rate; introducing a first fuel, a second fuel, and an oxidant into the second cylinder set, thereby defining a second substitution rate; monitoring at least one engine parameter; and adjusting the first substitution rate to a third substitution rate in at least one cylinder of the first cylinder set, in response to the monitoring. The third substitution rate is different than the second substitution rate.

BRIEF DESCRIPTION OF THE DRAWINGS

Aspects of the disclosure may be understood with reference to the following detailed description.

DETAILED DESCRIPTION

In embodiments of the invention, a method for operating an engine is provided. The engine may be an internal combustion engine (ICE). The method employs providing a plurality of fuels to operate the engine. The method may switch engine operation from a steady state to an increased load state and/or may respond to (or anticipate) the switch. As used herein, the term "steady state" indicates engine load or engine speed is substantially stable for a determined period.

The fuels may include at least a first fuel and a second fuel. The first and second fuels may include a non-compression-combustible fuel and a compression-combustible fuel, respectively. As used herein, the term "non-compression-combustible fuel" means any single material or combination of materials that is not intended to spontaneously ignite or combust under expected operating conditions, but is intended to ignite or burn with the aid of an ignition spark, pilot fuel, or an existing flame propagating in a reciprocating engine cylinder. The term engine refers to an internal combustion engine (ICE).

While most fuels will be compression-combustible at sufficiently high temperatures, the non-compression-combustible fuels referred to here are fuels that are intended to ignite via flame propagation and that auto-ignition or compression-combustion be avoided. Non-limiting examples of such fuels include hydrogen, natural gas, ethanol or gasoline.

The term "compression-combustible fuel" means a single material or combination of materials that are intended to spontaneously ignite or combust, without the aid of an ignition spark or existing flame, in a reciprocating engine cylinder during and/or immediately after a compression stroke of a piston therein. In some examples, fuels may be considered non-compression combustible and compression combustible. Different engine configurations, such as low-compression, high compression, and the like may adjust combustion parameters such that certain fuels may be a non-compression combustible with a first engine configuration and compression combustible in another engine configuration. Non-limiting examples of the compression-combustible fuels include one or more of ammonia, diesel, kerosene, methanol, natural gas, ethanol, hydrogen, and heavy fuel oil.

During the increased load state of the engine, the quantity of the first fuel may be reduced and the quantity of the second fuel may be increased for introduction into a cylinder of the engine, as compared to operation in the steady state thereof, such that the total fuels into the engine is increased. In some examples, the quantity of the first fuel is decreased to be in a range of from about 70% to about 50% and the quantity of the second fuel may be increased to be in a range of from 30% to about 50%. The term "substitution rate" means the relative quantity of non-compression-combustible fuel to the total fuel used in the combustion chamber during an engine cycle.

Embodiments may relate to methods and systems for a multi-fuel system of an engine. The first and second fuels may have relatively different amounts of carbon. In one example, the ICE may be a multi-fuel engine may combust a plurality of fuels. Each of the plurality of fuels may be stored in separate fuel tanks. In one embodiment, one or more of the fuels and its corresponding fuel tank may be housed in a different fuel tank including a different fuel. In one example, a gaseous fuel tank including a gaseous fuel may be arranged within an interior volume of a liquid fuel tank including a liquid fuel.

The ICE may combust one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels, liquid fuels, and solid fuels, alone or in combination. The substitution rate of a primary fuel of the ICE with a secondary fuel may be determined based on a current engine load. In one embodiment, the substitution rate may correspond to an injection amount of a fuel with a relatively lower carbon content or zero carbon content (e.g., hydrogen gas or ammonia). As the substitution rate increases, the relative proportion of fuel with the lower or zero carbon content increases and the overall amount of carbon content in the combined fuel lowers. Additionally or alternatively, the substitution rate may correspond to an injection amount or delivery of a gaseous fuel relative to a liquid fuel.

In one example, the ICE may combust fuels that include both diesel and natural gas. During some operating modes, the ICE may combust only diesel, only natural gas, or a combination thereof (e.g., during first, second, and third conditions, respectively). When natural gas is provided, operating conditions may be adjusted to promote enhanced combustion of the natural gas. The engine system may combust a mixture of three or more fuels including diesel, natural gas, and ammonia. Additionally or alternatively, ethanol and/or hydrogen may be included in the combustion mixture.

In one example, systems and methods for the multi-fuel engine may include combusting a primary fuel in combination with one or more secondary fuels. The multi-fuel engine may combust the primary fuel alone. During some conditions, the multi-fuel engine may decrease an amount of primary fuel used via substituting one or more secondary fuels into a combustion mixture. The secondary fuels may include a reduced carbon-content relative to the primary fuel. Additionally or alternatively, the secondary fuels may be less expensive, more available, and/or more efficient. The secondary fuels may vary in ignitibility and burn rate. An ignition timing of the multi-fuel engine may be adjusted in response to the combustion mixture to account for inclusion of the secondary fuels. For example, the ignition timing may be retarded as an amount of hydrogen is increased. As another example, the ignition timing may be advanced as an amount of ammonia is increased. The ignition timing may be further adjusted in this way in response to addition and subtraction of the primary and one or more secondary fuels to the combustion mixture. By doing this, knock and pre-combustion may be mitigated, reduced or avoided.

Embodiments of the system described herein may include a variety of suitable engine types, and a variety of suitable engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, aircrafts, rail vehicles, and other off-highway vehicles (OHVs). For clarity of illustration, a rail vehicle such as a locomotive may be provided as an example of a mobile platform. In one example, a vehicle system may include an engine, a turbocharger, an aftertreatment system, a fuel system, and a control system.

Figure 1:
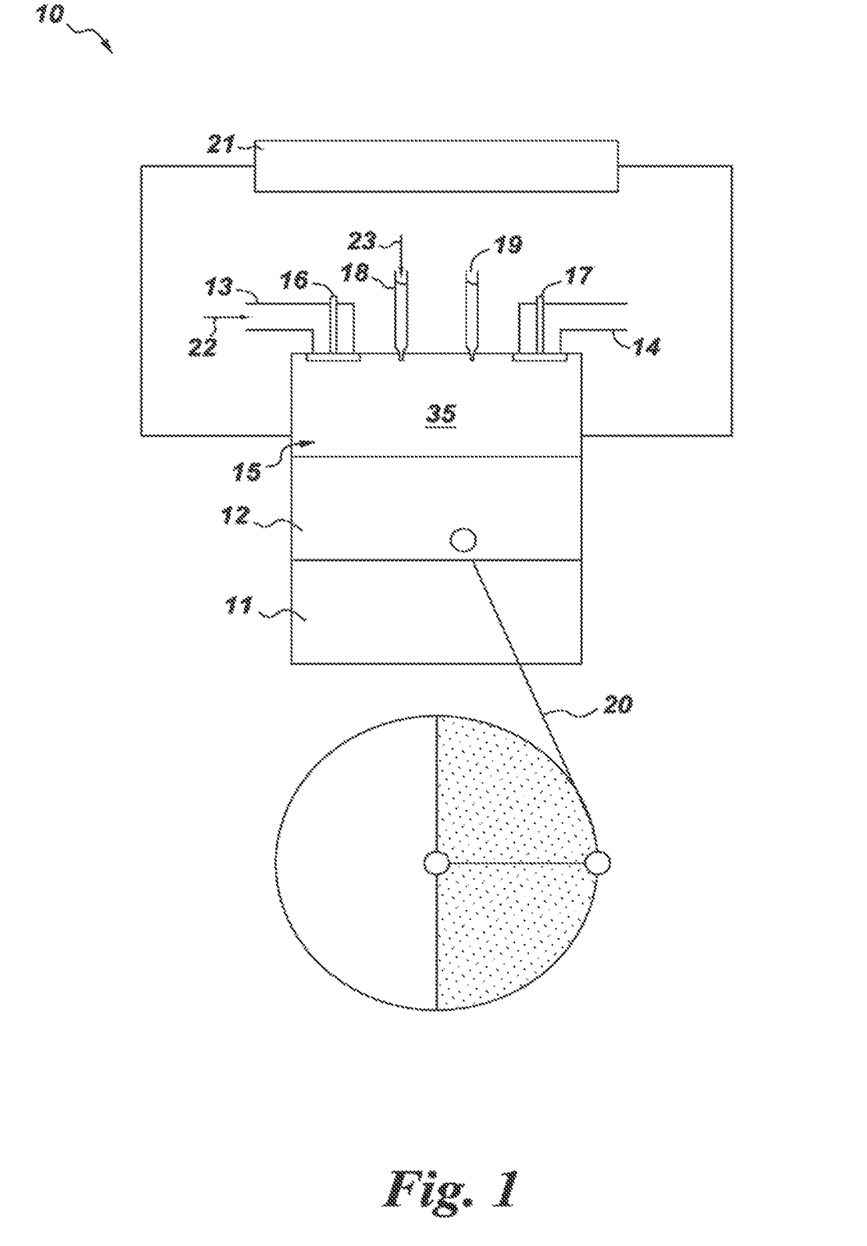
FIG. 1 is a schematic diagram of an engine cylinder of an engine in accordance with one embodiment of the disclosure.

FIG. 1 illustrates a schematic diagram of a cylinder 11 of an engine 10 in accordance with one embodiment of the invention. Although a single cylinder of the engine is illustrated, the engine may include more than one cylinder, for example four, six, eight, or twelve cylinders cooperating to provide suitable power based on different applications. For ease of illustration, other elements, such as sensors and sealing elements are not illustrated in FIG. 1.

As illustrated in FIG. 1, the engine includes the cylinder having a piston 12 movably located therein. An intake manifold 13 and an exhaust manifold 14 are in fluid communication with a combustion chamber 15 defined within the cylinder, respectively. The intake manifold may provide an input pathway (not labeled) for introduction of an oxidant and a first fuel into the combustion chamber. Alternatively, the intake manifold may provide an input pathway (not labeled) for introduction of only an oxidant from the intake manifold into the combustion chamber (i.e., the first and second fuel are injected directly into the combustion chamber). The exhaust manifold may provide an output pathway (not labeled) for all products of a combustion event that takes place in the combustion chamber.

A plurality of valves, such as an intake valve 16 and an exhaust valve 17 may actuate at certain times and for certain durations to open and close fluid pathways (not labeled) between the combustion chamber and the respective intake manifold and the exhaust manifold. Additionally, one or more injectors, such as first and second injectors 18, 19 are in fluid communication with the combustion chamber so as to provide at least one fuel into the combustion chamber. The second injector may provide a second fuel or also provide a first fuel. It should be clear to one skilled in the art that any of the injectors may be in direct communication with the combustion chamber or may only be in fluid communication with the combustion chamber through a manifold such as the intake manifold or via a prechamber A connecting rod 20 may be disposed between and connecting the piston and a transmission mechanism, such as a crank shaft (not shown) so as to transmit the translational mechanical energy generated by the engine into rotational energy for further use.

In addition, the engine may include a control unit 21. The control unit can control operation or status of the engine based at least in part on outputs from a plurality of sensors (not shown). The sensors may monitor or detect a plurality of (measured or monitored) engine parameters including pressures, temperatures, flow rates, speed and power so that the control unit may determine and control other parameters. These parameters may include fuel injection timings and quantities for all fuels being introduced accordingly.

Suitable sensors include fuel injection timing sensors, fuel flow sensors, throttle position sensors, manifold air pressure sensors, manifold air temperature sensors, exhaust gas temperature sensors, engine power sensors, knock sensors or the like. The measured engine parameters may include at least one of engine speed, engine load, engine throttle position, intake manifold temperature, intake manifold pressure, exhaust gas flow rate and temperature, air flow into the cylinder, compression ratio, intake and exhaust valve timing.

In other embodiments, examples of other engine parameters may include a status of one or more sensors. For example, a measured engine parameter may include if a particular sensor (e.g., knock sensor, temperature sensor, etc.) is degraded or not operating as desired.

In still another embodiment, another engine parameter may include an aftertreatment status. The aftertreatment status may include temperature, flow, and/or pressure drop of a predetermined quantity, whether the aftertreatment is regenerating, measured engine operation over time, anticipated regeneration start event, estimated collection of flammable substances in the aftertreatment system, and the like.

During operation of a so-called four-stroke engine, each cylinder may undergo a four stroke cycle including an intake stroke, a compression stroke, an expansion stroke, and an exhaust stroke. As referred to FIG. 1, during the intake stroke, the exhaust valve closes and the intake valve opens. A mixture 22 is introduced into the combustion chamber through the intake manifold while the piston moves towards a bottom of the cylinder to increase the volume within the combustion chamber until the piston moves to a position where the combustion chamber is at its largest volume. This position may be referred to as a bottom dead center (BDC) to complete the intake stroke.

For the illustrated arrangement, the mixture may include the first fuel, such as the natural gas and at least one oxidant. In non-limiting examples, the at least one oxidant includes one or more of air, pure oxygen, oxides such as nitrogen oxides and sulfur oxides, or either of which may be mixed with re-circulated exhaust gas. Prior to introduction of the mixture into the combustion chamber, the at least one oxidant and the first fuel are premixed. In one non-limiting example, the premixing may take place in the intake manifold. Due to the employment of the control unit, the quantities and/or premixing of the first fuel and the at least one oxidant may be controlled based at least in part on the detected engine parameters.

As used herein, the term "premixed" means increasing the level, degree, and/or factor of homogeneity of two, or more, substances prior to an event. By example only, the air and the first fuel may be premixed to generate the premixed mixture prior to the combustion event such that the level or degree homogeneity of the air and the first fuel has increased. Once the mixture enters the combustion chamber it may be referred to as a second mixture 35.

In an alternative embodiment, the mixture may include only one or more oxidants being introduced into the combustion chamber from the intake manifold, wherein the first and second fuel are injected directly into the combustion chamber via one or more injectors. As used herein, the term "combustion event" means the activities occurring when a fuel(s)/air mixture is ignited and/or burned, partially or entirely, in a combustion chamber of an engine, thereby producing heat, carbon dioxide, steam, and other chemicals, regardless of whether the event was via spark ignition, compression ignition, or other suitable means.

Subsequently, during the compression stroke, the intake valve and the exhaust valve are closed. The piston moves towards the cylinder head (not labeled) so as to compress the second mixture within the combustion chamber. The position at which the piston is at the end of this stroke when the combustion chamber is at its smallest volume is referred to as top dead center (TDC).

At the end of the compression stroke, in one non-limiting example, a certain quantity or amount of the second fuel is controlled by the control unit to be directly injected into the combustion chamber via one or more of the injectors. Alternatively, the second fuel may be injected into the combustion chamber before the piston moves to the top dead center of the compression stroke.

In this compression stroke, because the second mixture is leaner than stoichiometric, the first fuel, such as the natural gas in the second mixture may not be prone to auto-ignition. Due to the compression-combustible property, the second fuel may be prone to ignite upon injection into the combustion chamber, thereby igniting the second mixture of the air and the natural gas so as to trigger combustion accordingly. As used herein, the term "lean" means a fuel(s)/oxidant(s) mixture having more oxidant(s) than the amount of oxidant(s) required at the stoichiometric point for the particular mixture. The term "stoichiometric" means a fuel(s)/oxidant(s) mixture having exactly enough oxidant(s) required to convert all of the fuel(s) to primary combustion products (e.g., $CO_2$ and $H_2O$ for hydrocarbon fuels).

Next, during the expansion stroke, due to the combustion, expanding gases generated during the combustion push the piston back to BDC. The connecting rod converts the movement of the piston into the rotational energy for further use. Finally, during the exhaust stroke, the exhaust valve opens to release the combusted air-fuel mixture through the exhaust manifold and the piston returns to TDC.

In some examples, instead of injection of the second fuel during the compression stroke, the first mixture and the second fuel may be introduced into the combustion chamber to mix together over time therein during the intake stroke prior to any combustion so that the degree of homogeneity of the second mixture and the second fuel increases. Subsequent to the mixing, the second fuel is combusted via compression of the piston during the compression stroke.

During operation of the engine, the control unit controls the engine operation based at least in part on the monitored engine parameters and the operator demand for power. Based on the monitoring of the parameters of the engine, when the engine is detected to operate, for example, in a steady state, the ratio of the first fuel, such as the natural gas to the second fuel, such as the diesel, is high and stable, and reduces the emissions of pollutants.

However, as mentioned above, in some current applications, when the engine operates to respond to a transient condition to switch from a steady state to a transient acceleration state, the quantity of the natural gas may be controlled to increase to a certain amount to provide desirable power. A suitable transient condition may be a change in the load on the engine. As a result, this may reduce the overall air to fuel ratio (AFR) and may cause the auto-ignition of the premixed natural gas during the compression stroke. The premixed natural gas burns volumetrically and may cause detonation or knocking in the engine.

Accordingly, in embodiments of the invention, compared to the operation in the steady state, when the engine operates in the increased load state, the quantity of the first fuel may be reduced and the quantity of the second fuel may be increased. This may be done because the second fuel ignites upon injection and thus may not burn volumetrically so that the detonation or knocking may be avoided or eliminated.

For some arrangements, during the operation of the engine to respond to the transient requirements such as the increased load state, a first cylinder of the engine may act as a transient cylinder to respond to the increased load condition by decreasing the amount of the first fuel, increasing the amount of the second fuel and increasing the overall fuel rate to generate more power. A second cylinder of the engine may act as a base-load cylinder which operates with a substantially constant substitution rate of the first fuel to the second fuel, for example in a steady state or adjusting the fuel rate gradually as the air flow or other monitored parameters change.

In some applications, the base-load cylinder may have different operation conditions from the transient cylinder so as to respond slowly to the increased load operation than the transient cylinders. In some examples, a quantity of one of the first fuel, the second fuel, and the oxidant introduced to the first engine cylinder is different from a quantity of one of the first fuel, the second fuel, and the oxidant to the second cylinder based on one or more of the monitored engine parameters. For example, the quantity of the first fuel in the base-load (second) engine cylinder is greater than the quantity of the first fuel in the transient (first) engine cylinder, and the quantity of the second fuel in the base-load engine cylinder is smaller than the quantity of the second fuel in the transient engine cylinder during responding to the increased load operation. As used herein, "one" means one or more. After finishing the increased load operation, the base-load cylinder and the transient cylinder may operate in a similar or an identical steady state mode.

In the transient cylinder, the control unit may control conditions such that the first fuel for introduction therein may be in a range of from about 50% to about 70% of total energy content therein. In one example, the first fuel for introduction may be about 60% of the total energy content therein. In the steady state, the ratio of the first fuel to the second fuel may not vary in the corresponding cylinders, for example may be equal for all of the cylinders of the engine.

Figure 2:
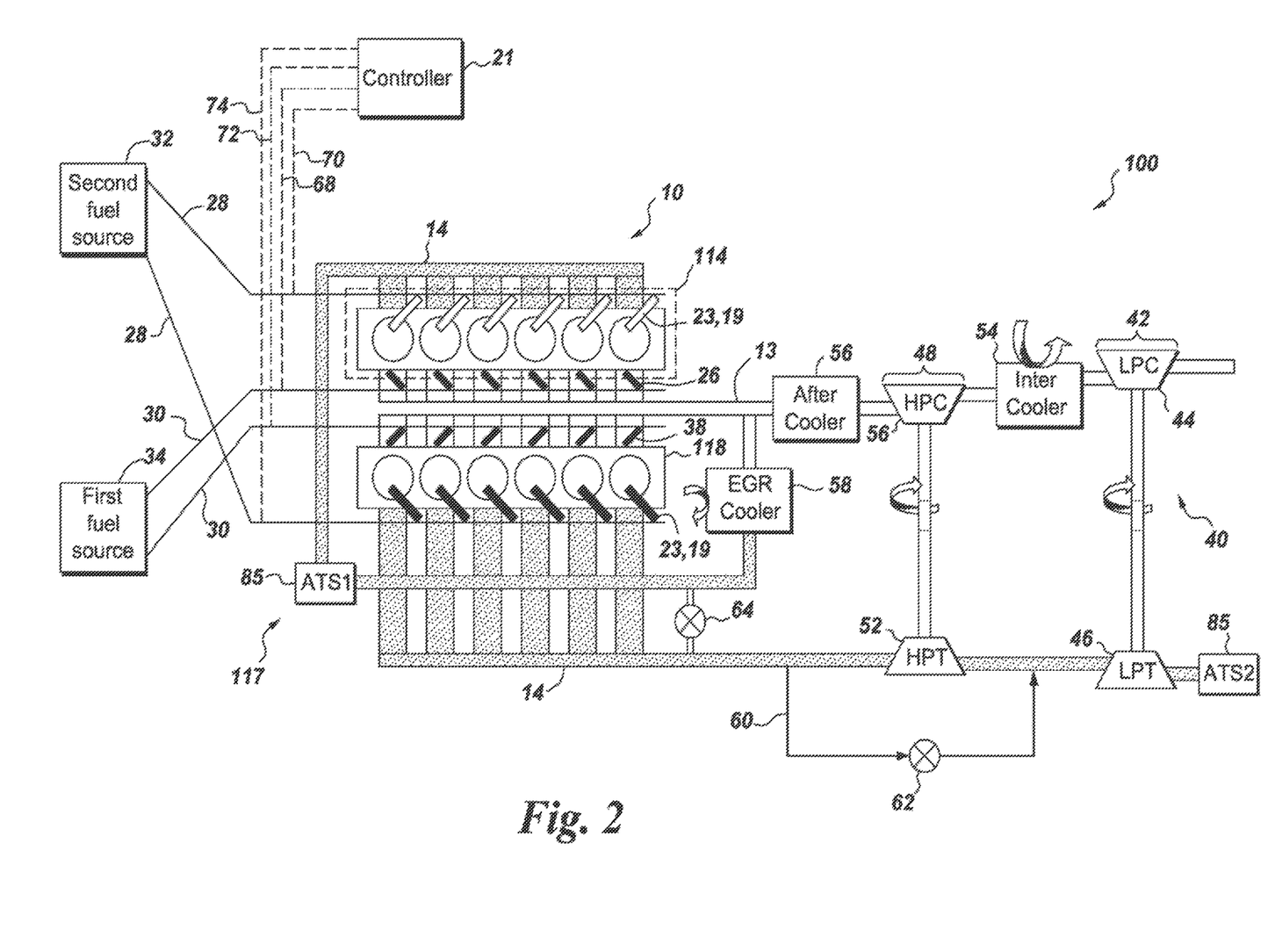
FIG. 2 is a schematic diagram of a system for operating an engine in accordance with one embodiment of the disclosure.

FIG. 2 schematically illustrates an exemplary system 100 for operating an engine in accordance with an embodiment. The engine may include a donor cylinder set 114 having multiple donor cylinders coupled to the intake manifold that may feed a flow of air to the donor cylinder set. The engine may include a non-donor cylinder set 118 coupled to the intake manifold and exhaust manifold. The intake manifold may feed air to the non-donor cylinder set. The engine may include an exhaust channel 14 extending from the donor cylinder set to the intake manifold for recirculating an exhaust emission in an exhaust gas recirculation (EGR) loop 117 from the donor cylinders to both donor cylinders, and non-donor cylinders via the intake manifold.

Each cylinder of the donor cylinder set includes a second direct injector 19 that injects a second fuel 28 from a second fuel source 32. The system may include a first port injector 26 disposed in each of a plurality of first intake passages may inject a first fuel 30 from a first fuel source 34. Similarly, each cylinder of the non-donor cylinder set may include a third direct injector 23 and a fourth port injector 38. The third direct injector injects the second fuel from the second fuel source, while the fourth port injector 38 disposed in each of a plurality of second intake passages 39, injects the first fuel from the first fuel source. In one embodiment, the second fuel includes diesel fuel. In some embodiments, the second fuel includes ammonia. The first fuel may include at least one of natural gas, nitrogen, hydrogen, syngas, gasoline, ethanol, carbon monoxide, propane, biogas, liquid petroleum gas (LPG), and/or solid fuel. In this way, the engine may operate with diesel fuel and natural gas, diesel fuel and hydrogen, ammonia and natural gas, or other combinations of the fuels listed herein.

Furthermore, the system may include a two-staged turbocharger 40. The turbocharger may provide compressed air to the engine through the intake manifold. The turbocharger may include a first stage turbocharger 42 that includes a low pressure compressor 44 and a low pressure turbine 46. The two-staged turbocharger may include a second stage turbocharger 48 having a high pressure compressor 50 and a high pressure turbine 52. As shown in FIG. 2, the low pressure compressor, the high pressure compressor and the intake manifold are in fluid communication with each other. Ambient air is routed through the low pressure compressor and the high pressure compressor for sufficient compression prior to being directed into the intake manifold. The flow of air is cooled in two stages in an intercooler 54 located between the compressors and in an aftercooler 56 located between the high pressure compressor and the intake manifold. The exhaust emissions in the exhaust gas recirculation loop are also cooled in an EGR cooler 58 prior to being directed into the intake manifold. In one embodiment, each of the intercooler, aftercooler and the EGR cooler is a heat exchanger that may utilize a fluid for extracting heat thereby cooling the flow of air and exhaust emissions flowing through each of the cooler. The exhaust emissions flowing out of the non-donor cylinder group through the exhaust manifold are routed through the high pressure turbine and the low pressure turbine prior to being released out of the system. As shown in FIG. 2, the high pressure turbine and the low pressure turbine are driven by the force of the exhaust emissions and in turn drive the high pressure compressor and the low pressure compressor respectively. In one embodiment, the system includes a high pressure turbine (HPT) bypass line 60 having a valve 62 that may be operated to route the exhaust emissions directly through the low pressure turbine bypassing the high pressure turbine. In another embodiment, the system also includes a valve 64 located in a fluid line connecting the EGR loop and the exhaust manifold for controlling flow of exhaust emissions in the EGR loop. The system may include a single staged turbocharger (not shown) to provide compressed air to the multi fuel engine through the intake manifold.

The system may include a controller or electronic control unit (ECU), coupled to various sensors and components throughout the system. As shown, the controller includes electrical connections 68, 70, 72 and 74 that are coupled with fuel lines that supply the second fuel and first fuel to the donor cylinder group and the non-donor cylinder group. Thus, the controller may, during a single engine cycle, operate the first direct injector and the second port injector, the third injector and the fourth port injector in each of the donor cylinder set and the non-donor cylinder set respectively, such that there is a higher fraction of injection of the second fuel into the donor cylinder set in comparison to the second fuel being injected into the non-donor cylinder set and a lower fraction of injection of the first fuel into the donor cylinder set in comparison to the first fuel being injected into the non-donor cylinder set. This operation of differential fueling reduces the risk of knock in the donor cylinder set while maintaining a determined power output. In one non-limiting example, a quantity of the second fuel injected into the donor cylinder set is about 40 percent of a total fuel combusted in the donor cylinder set, while a quantity of the second fuel injected into the non-donor cylinder set is about 14 percent of a total fuel combusted in the non-donor cylinder set. This allows more consumption of the first fuel and thereby, resulting in economical operation of the engine. This operation of differential fueling is carried out during high load or high ambient temperature conditions. The multi fuel engine may operate such that the quantity of the second fuel injected into the donor cylinder set may vary from about one percent to about 100 percent.

Moreover, in one embodiment, during low power load conditions or low ambient temperature conditions, the controller may operate the first direct injector and the second port injector in the donor cylinder set at an optimal second fuel injection timing so as to obtain higher substitution rate of the second fuel as compared to substitution rate of the second fuel in the non-donor cylinder set. Further, the terms 'substitution rate' to each cylinder in the donor cylinder set may be defined as a ratio of first fuel supply to a total fuel. This causes generation of emissions from the donor cylinder set with increased amounts of carbon monoxide. The recirculation of the emissions having increased amounts of carbon monoxide from the donor cylinder set to the non-donor cylinder set and the donor cylinder set for further oxidizing the carbon monoxide. Operating the injectors at optimal second fuel injection timing so as to obtain high substitution rate of the second fuel per the first fuel in each cylinder of the donor cylinder set is carried out at low power or low ambient temperature conditions. In another embodiment, at low power or low ambient temperature conditions, each non-donor cylinder of the non-donor cylinder set may be operated at lower substitution rate in order to control emissions, while donor cylinder set may be operated at high substitution rate. It is to be understood that the terms 'substitution rate' to each cylinder in the non-donor cylinder group may be defined as a ratio of first fuel supply to a total fuel supply.

Figure 3:
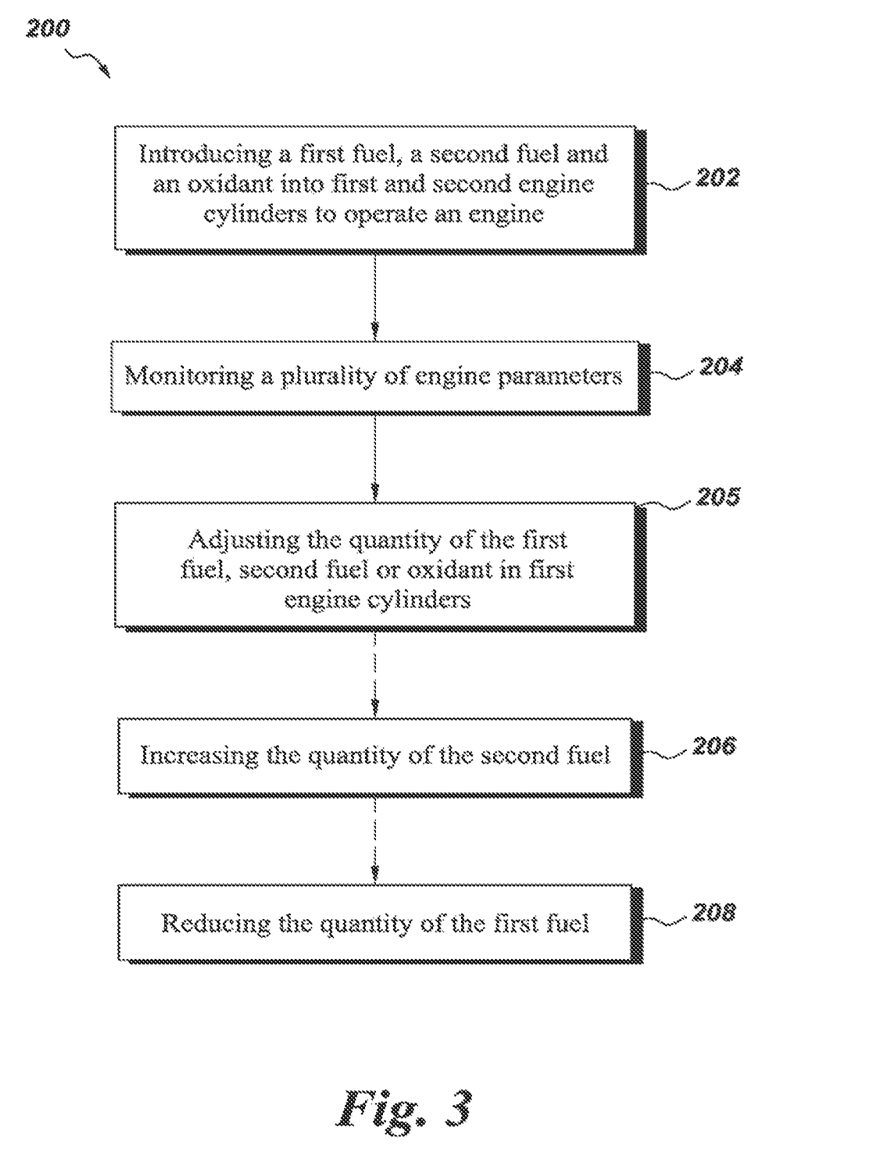
FIG. 3 is a schematic flow chart showing operation of the engine in accordance with one embodiment of the disclosure.

FIG. 3 is a schematic diagram of the method 200 for introduction of the first and second fuels into a first engine cylinder when the engine operates in the increased load state. It should be noted that the arrangement in FIG. 3 is merely illustrative. As mentioned above, more than one engine cylinder may be employed and the more than one engine cylinder may include a transient engine cylinder (a first engine cylinder) and a base-load engine cylinder (a second engine cylinder).

As illustrated in FIG. 3, in step 202, introducing a first fuel, a second fuel and an oxidant into the first engine cylinder to operate an engine. In step 204, monitoring a plurality of engine parameters. At step 205, adjusting a first fuel, a second fuel, and/or an oxidant in the first cylinder, based on the monitored engine parameters.

Subsequently, optionally in step 206, based on one or more of the monitored engine parameters, increasing the quantity of the second fuel to be in a range of from about 30% to about 50% of total energy content for introduction into the first engine cylinder. Meanwhile, optionally in step 208, reducing the quantity of the first fuel to be in a range of from about 50% to about 70% in the first engine cylinder.

In some applications, after the increased load operation of the engine finishes, the engine may be controlled to operate in the previous or another steady state, and the ratio of the first fuel to the second fuel is increased and stable accordingly. In some examples, the sequences of introducing the fuels into the cylinder and monitoring the engine parameters may be the same or different. The sequences of the steps 206 and 208 may also be the same or different based at least in part on application specific requirements.

In embodiments of the invention, the ratio of the first fuel to the second fuel is adjusted in some cylinders in response to the engine operation conditions. For example, in the transient acceleration operation, the quantity of the second fuel is increased and the quantity of the first fuel is reduced so as to avoid detonation or knocking issues generated in the engine. At the same time, the total amount of the fuels (for example, the total quantities of the first fuel and the second fuel) supplied is increased to increase the power level.

In addition, the method for operating the engine in response to the transient acceleration condition is relatively simple to retrofit the conventional engines. In certain applications, the method may be used in response to not only the transient acceleration operation but also other transient operations. Non-limiting examples of the transient operation include the operations switched from respective steady states.

The individual cylinders may further be adapted as needed, based on their purpose. For example, the cylinders that are accepting the transient fueling may be equipped with different compression ratio, different valve lift profiles, different sensors or different hardware configurations than the base load cylinders. In some applications, differences of the hardware configurations between the transient cylinders and the respective base load cylinders may include one of a valve event, compression ratio, piston, piston ring, valve lift profile, pressure sensor, temperature sensor, knock sensor, injector or injector nozzle.

In other embodiments, the individual cylinders of the engine may include a first set and a second set of cylinders wherein the first set is for transient fueling and the second set is for non-transient fueling. The first set may include all non-donor cylinders while the second set may include donor cylinders. The quantity of cylinders in the first and second set may be equal. In other embodiments, the quantity of cylinders may be different.

In an embodiment, a first and second fuel and oxidant are introduced into a first cylinder set, thereby defining a first substitution rate, while first and second fuel and oxidant are introduced into a second cylinder set, thereby defining a second substitution rate. Various engine parameters are monitored continually or periodically. In response to the engine parameter monitoring, the controller adjusted the first substitution rate in one or more (or all) of the cylinders in the first cylinder set to a third substitution rate that is different than the second substitution rate. The third substitution rate typically is less than the first substitution rate. In an embodiment, the first cylinder set may include non-donor cylinders and the second cylinder set may include donor cylinders. In another embodiment, the first cylinder set may include donor cylinders and the second cylinder set may include non-donor cylinders.

In another embodiment, the third substitution rate may be less than the first substitution rate. In an example of this embodiment, the third substitution rate may include turning off all first fuel in a single cylinder in the case where a status of a sensor to a cylinder is detecting to not be working (e.g., knock sensor). For example, if a knock sensor for one (or more) cylinder is not working, all natural gas to that particular (or more than one) cylinder is turned off. Additionally or alternatively, natural gas to that particular cylinder may be turned off only for certain combination of load and manifold air temperature. For example, disabling the first fuel when a knock sensor is degraded while torque is above a determined percentage of total torque and/or where the manifold air temperature is above a determined temperature.

In still another embodiment, a monitored engine parameter may include ambient temperature. During cold operations (e.g., ambient temperature being below a predetermined threshold), the third substitution rate may be greater than the first substitution rate in the situation where the first cylinder set includes donor cylinders. For example, during cold operation, the controller can call for an increase in natural gas being introduced into the donor cylinders. One benefit is increased HC or CO emissions that can be oxidized in the non-donor cylinders.

During cold ambient and/or cold engine start up conditions an embodiment can advance the combustion timing in the donor cylinders and/or retard timing the non-donor cylinders. In this manner, the non-donor cylinders, having retarded timing, can assist in heating up the exhaust more quickly, so as to activate the aftertreatment system.

In still another embodiment, a monitored engine parameter may include either measured or calculated status of an aftertreatment where the aftertreatment system may suffer degradation as a result of a sudden increase in temperature beyond a limited temperature (e.g., temperature point, rate of rise, etc.). This may be in conjunction with extended idle or cold operation. For example, the status of the aftertreatment may be that the aftertreatment has accumulated a large amount of flammable material including oil, unburned or partially burned fuel, and/or particulate. Alternatively, the status of the aftertreatment may be that it is at a relatively low temperature and would suffer from extreme thermal stresses in the event of a sudden increase in temperature. In this embodiment, the fueling may be adjusted such that the temperature of the aftertreatment is controlled to prevent damage.

In a multi-cylinder engine system with aftertreatment, exhaust from some of the cylinders is fed to an aftertreatment system, while exhaust from other cylinders is not fed to the aftertreatment system. In a donor cylinder engine system, either the set of donor or non-donor cylinders may pass exhaust through an aftertreatment system, while the other set of non-donor or donor cylinders do not pass exhaust through the aftertreatment system. Alternatively, in a multi-cylinder engine, some cylinders may exhaust directly to the atmosphere while other cylinders exhaust to an aftertreatment system. In this case, the cylinders that exhaust to the aftertreatment system may be operated to minimize exhaust temperature and unburned or partially burned fuel if the status of the aftertreatment system indicates that this could result in an unacceptable rise in temperature. For example, an aftertreatment system (ATS1) may be located after the donor cylinders only. In an alternative embodiment, an aftertreatment system (ATS2) may be located only after the low pressure turbine. In another embodiment, both aftertreatment systems (ATS1, ATS2) may be located after the donor cylinders and after the low pressure turbine.

Figure 4:
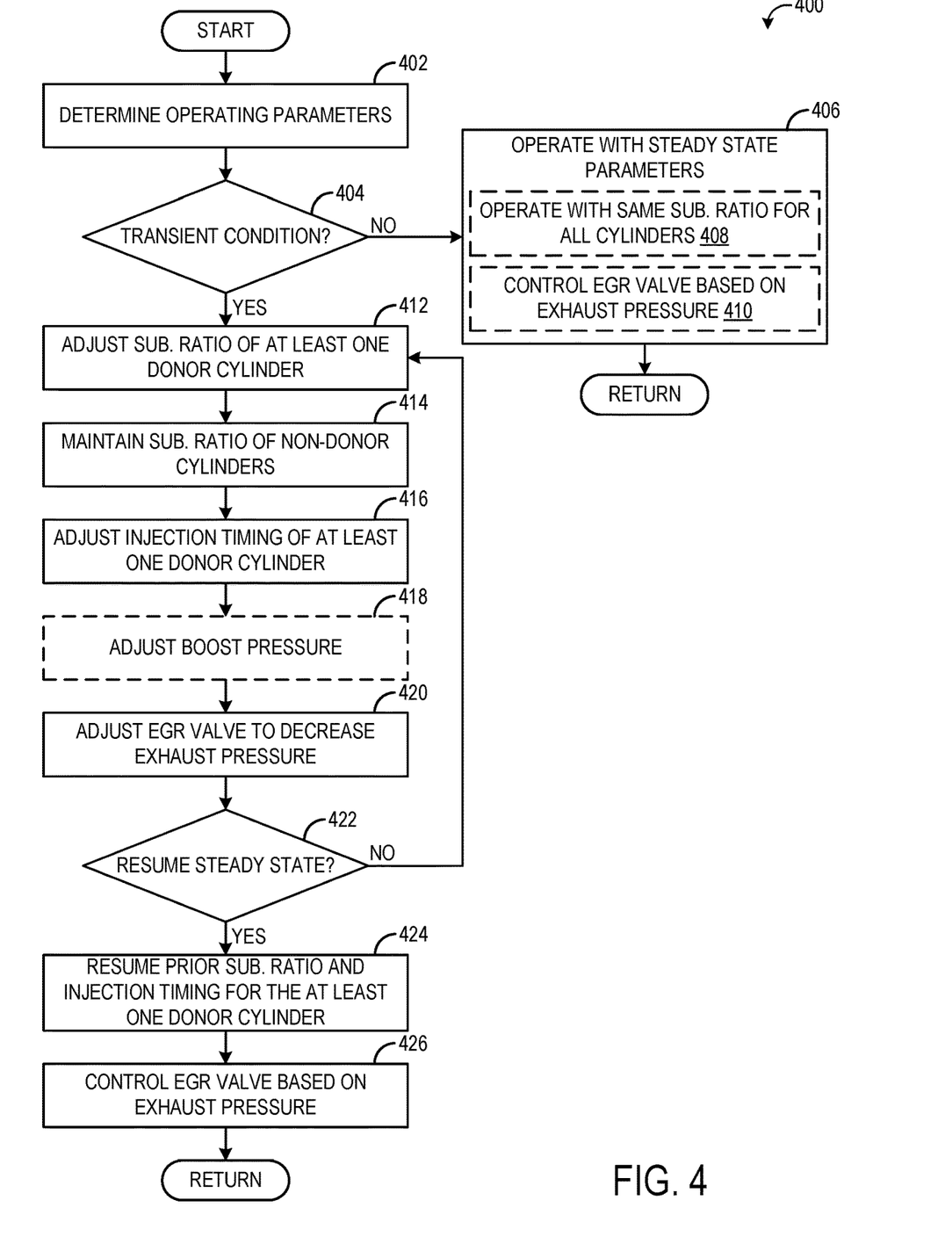
FIG. 4 is a flow chart illustrating a method for operating the engine according to an embodiment of the disclosure.

FIG. 4 illustrates a method 400 for controlling a multi fuel engine, such as engine 100. The method may be carried out with the components shown in FIGS. 1-2, though other configurations are possible without departing from the scope of this disclosure. The method may be carried out according to non-transitory instructions stored in memory of an electronic controller and executed by a processor of the electronic controller.

At step 402, operating parameters are determined. The operating parameters may include current engine load, commanded engine load, engine speed, engine temperature, ambient temperature, and the like, as well as current fueling parameters such as current fuel substitution ratio and fuel injection timing. At step 404, the method includes determining if the engine is currently operating in, or is initiating, a transient condition. A transient condition may include a change in operating parameters, such as a change in commanded load. When the engine is controlled to move from the current operating point (e.g., current load) to the updated commanded operating point (e.g., an increased load state), the engine operating period during the move from the current operating point to the updated commanded operating point may be considered the transient condition. As another example, when engine load, engine speed, or another engine parameter is changing by more than a threshold amount (e.g., by more than 1-10%), the engine may be considered to be operating in a transient condition.

If the engine is not operating in a transient condition, the method proceeds to step 406 to operate with steady state operating parameters. The steady state parameters may include operating with a substitution ratio that is the same for all cylinders, as indicated at step 408. The substitution ratio may be controlled based on current engine conditions, and may be equal for all cylinders, including the same substitution ratio for the donor cylinders as the non-donor cylinders. Further, during steady state conditions, an EGR valve of the engine may be controlled based on exhaust pressure or another suitable parameter (e.g., engine load, intake oxygen fraction), as indicated at step 410. However, once the engine operates in steady state, the EGR valve may be generally maintained in the same position due to a relatively steady exhaust pressure, load, etc., being present during the steady state conditions. The method then returns.

Returning to step 404, if it is determined that the engine is operating in the transient condition (or is about to enter the transient condition, such as upon a change in load being requested), the method proceeds to step 412 to adjust the substitution ratio of at least one donor cylinder, while maintaining the prior substitution ratio of the non-donor cylinders, as indicated at step 414. In some examples, the substitution ratio may be adjusted for all the donor cylinders. In other examples, the substitution ratio may be adjusted in at least one but not all donor cylinders. The substation ratio in the at least one donor cylinder may be reduced, in some examples. As explained, transient conditions, such as transient acceleration conditions where the speed of the engine increases and/or torque demand increases, may result in a higher likelihood of knocking. The donor cylinders, owing to exhibiting increased exhaust backpressure relative to the non-donor cylinders, may be of increased likelihood of combustion issues relative to the non-donor cylinders. Thus, when the engine shifts to operate in a transient condition, the substitution ratio may be proactively adjusted (e.g., lowered, such that a higher fraction of liquid fuel is delivered to the donor cylinders than the non-donor cylinders) in the at least one donor cylinder relative to the non-donor cylinders. In some examples, in response to the transient condition, the total amount of fuel to both the donor cylinders and non-donor cylinders may be adjusted (e.g., increased). In other examples, the total amount of fuel to the non-donor cylinders may be maintained and the total amount of fuel may be increased to the at least one donor cylinder (while also adjusting the substitution ratio).

In some examples, additionally or alternatively, in response to a load increase, fueling to the non-donor cylinders may increase as they may impact turbocharger conditions more than the donor cylinders. The total fueling and the substitution rate may change between the donor and non-donor cylinders. For example, the non-donor cylinder may include a higher total fuel and a low substitution rate to reduce a risk of knock and increased emissions and the donor cylinders may include lower total fueling and a higher substitution rate. By doing this, emissions from the donor cylinders may pass through the non-donor cylinders and undergo a combustion cycle prior to flowing to an exhaust passage.

In some examples, in response to the transient condition, the injection timing of the at least one donor cylinder may be adjusted to proactively address potential combustion issues such as pre-ignition. For example, some fuels such as hydrogen may be prone to pre-ignition during higher engine loads. Thus, ignition timing may be adjusted (e.g., retarded) in the at least one donor cylinder responsive to a transient condition. In some examples, both the substitution ratio and the ignition timing may be adjusted in response to any type of transient load increase. In other examples, only the ignition timing or the substitution ratio may be adjusted in response to load increases below a threshold load, and then both the substitution ratio and ignition timing may be adjusted in response to load increases above the threshold e.g., increasing to maximum rated load. Further, in some examples, boost pressure may be optionally adjusted in response to the transient condition, as indicated at step 418. In one example, lowering the boost pressure may lower an in-cylinder compression pressure, while maintaining a similar cylinder temperature. While the lower pressure may decrease a likelihood of knock, the premixed mixture may become richer and cause the premixed fuel to burn faster and lead to higher cylinder pressures during some conditions. In other conditions, lowering the boost to accelerate the premixed fuel combustion before the mixture may auto-ignite/knock. Adjusting boost pressure may lower combustion temperatures and reduce the likelihood of combustion issues. Boost pressure may be adjusting by adjusting a turbine bypass valve. Due to the common intake system, the boost pressure may be adjusted to both the donor cylinders and the non-donor cylinders. In one example, boost pressure adjustment may be executed in response to a data stored in a multi-input look-up table where inputs include cylinder temperature, substitution rate, fuel types, acceleration, torque, mass flow, and boost pressure, wherein the output of the multi-input look-up table indicates adjusting the boost pressure may result in a reduced likelihood for knock.

At step 420, the method includes adjusting the EGR valve to decrease exhaust pressure. During the transient condition (e.g., transient load increase), exhaust backpressure may increase, which may further cause combustion issues in the donor cylinders. Thus, the EGR valve may be adjusted (e.g., moved to a more open position) to route additional exhaust gas from the donor cylinders to the exhaust, rather than back to the intake. Adjusting the EGR valve may result in a change in the intake oxygen fraction, so the adjustment to the EGR valve may be performed to prevent excessive exhaust backpressure while also maintaining a target EGR amount/intake oxygen fraction. However, during the transient condition, it may be desirable to increase the intake oxygen fraction and hence lower the EGR amount, which may be accomplished by opening the EGR valve.

The EGR valve may include a fully closed position, a fully open position, and positions therebetween. The fully closed position may correspond to about 100% of exhaust gases flowing back to the intake. The fully open position may correspond to about 100% of the exhaust gases flowing to the exhaust, and thus about 0% flowing to the intake. A more open position of the EGR valve may correspond to a position that flows more exhaust gas to the exhaust relative to a previous position. A more closed position of the EGR valve may correspond to a position that flow more exhaust gas to the intake relative to a previous position.

At step 422, the method may determine if the engine has resumed steady state operation. Once the transient condition ends (e.g., the commanded load is reached), the engine speed and engine load may resume steady state operation, where the speed and load are maintained at a stable speed and load. If the engine has not resumed steady state (e.g., engine speed and/or load are still changing), the method loops back to step 412 to continue to adjust (or maintain in the adjusted state) the substitution ratio, injection timing, boost pressure, and/or EGR valve position. If the engine has resumed steady state operation, the method proceeds to step 424 to resume operating at the prior substitution ratio and injection timing for the at least one donor cylinder. For example, if the substitution ratio in the at least one donor cylinder was reduced during the transient condition, the substitution ratio may be increased in the at least one cylinder, back to the prior substation ratio and equal to the substitution ratio of the non-donor cylinders. If the commanded load change also resulted in a commanded change in substitution ratio (for all the cylinders), the substitution ratio for the at least one donor cylinder may be adjusted to the new commanded substitution ratio rather than the prior substitution ratio. In either case, upon the steady state conditions being resumed, the substitution ratio for the donor cylinders may be the same as the non-donor cylinders. Additionally, the EGR valve may continue to be controlled based on exhaust pressure, as indicated at step 426. For example, the EGR valve may be moved to a more closed position (more closed than during the transient condition) and may be adjusted from the more closed position to control exhaust pressure. Method 400 then returns.

Thus, the method may control combustion stability during transient conditions in an engine with donor cylinders and non-donor cylinders that is may operate with multiple fuels, such as diesel and natural gas or diesel and hydrogen. However, as explained above, in some engine configurations, the engine may operate with ammonia and natural gas. In such examples, the control of combustion issues during transients may be different owing to the low burn rate of ammonia and natural gas. For example, excess exhaust residuals that may be maintained in the donor cylinders may result in misfire in donor cylinders fueled with ammonia and natural gas. To reduce or prevent misfire, the substitution ratio may be proactively increased in the donor cylinders during a transient condition, such that a higher fraction of gaseous fuel is delivered to the donor cylinders than the non-donor cylinders. Further, the EGR valve may be opened to reduce external EGR. In one example, the substitution ratio is adjusted for only a single engine cycle.

The disclosure provides support for a method for an engine including adjusting only a first substitution rate of a first fuel, a second fuel, and an oxidant delivered to at least one donor cylinder of the engine and maintaining a second substitution rate of the first fuel, the second fuel, and the oxidant delivered to at least one non-donor cylinder in response to a monitored engine parameter. A first example of the method further includes where the first substitution rate is less than the second substitution rate. A second example of the method, optionally including the first example, further includes where adjusting the first substitution rate comprises decreasing an amount of the first fuel and increasing an amount of the second fuel. A third example of the method, optionally including one or more of the previous examples, further includes where the first fuel has a lower carbon content than the second fuel. A fourth example of the method, optionally including one or more of the previous examples, further includes where the monitored engine parameter is an engine load or an engine speed. A fifth example of the method, optionally including one or more of the previous examples, further includes where the first fuel is carbon-free. A sixth example of the method, optionally including one or more of the previous examples, further includes where flowing exhaust gases from the at least one donor cylinder to the at least one non-donor cylinder. A seventh example of the method, optionally including one or more of the previous examples, further includes where the monitored engine parameter is a status of an aftertreatment device, the status comprising one or more of temperature, flow, pressure drop across the aftertreatment device, if the aftertreatment device is regenerating, an anticipated regeneration start event, and estimated collection of flammable substances in the aftertreatment device. An eighth example of the method, optionally including one or more of the previous examples, further includes where the monitored engine parameter is an ambient temperature. A ninth example of the method, optionally including one or more of the previous examples, further includes where the first substitution rate is greater than the second substitution rate.

The disclosure provides further support for a system including an exhaust gas recirculation system (EGR) comprising an exhaust channel extending from a donor cylinder to an intake manifold for recirculating an exhaust emission to the donor cylinder and a non-donor cylinder, and a controller with instructions stored on memory thereof that cause the controller to in response to a steady-state operation ending, decrease a first substitution rate of a first fuel and a second fuel in the donor cylinder and maintaining a second substitution rate of the first fuel and the second fuel in the non-donor cylinder. A first example of the system further includes where the instructions further cause the controller to adjust a position of an EGR valve coupled between the donor cylinder and an exhaust passage. A second example of the system, optionally including the first example, further includes where the donor cylinder is one of a plurality of donor cylinders, and wherein the instructions cause the controller to decrease the first substitution rate of each of the plurality of donor cylinders. A third example of the system, optionally including one or more of the previous examples, further includes where the donor cylinder is one of a plurality of donor cylinders, and wherein the instructions cause the controller to maintain the second substitution rate of the other donor cylinders of the plurality of donor cylinders. A fourth example of the system, optionally including one or more of the previous examples, further includes where the first fuel and the second fuel are selected from a plurality of fuels including one or more of gasoline, diesel, hydrogenation-derived renewable diesel (HDRD), alcohol(s), ethers, ammonia, biodiesels, hydrogen, natural gas, kerosene, syn-gas, and a cryogenic liquid.

The disclosure provides additional support for a system for a vehicle including an engine comprising a donor cylinder and a non-donor cylinder, an exhaust gas recirculation system (EGR) comprising an exhaust channel extending from the donor cylinder to an intake manifold, and a controller with instructions stored on memory that cause the controller to operate the donor cylinder and the non-donor cylinder at a given substitution rate including a first fuel, a second fuel, and an oxidant and operate the non-donor cylinder at the given substitution rate and the donor cylinder at a different substitution rate in response to a monitored engine parameter. A first example of the system further includes where the monitored engine parameter is a transient acceleration, and wherein the different substitution rate is less than the given substitution rate. A second example of the system, optionally including the first example, further includes where the monitored engine parameter is a low load or an ambient temperature, and wherein the different substitution rate is greater than the given substitution rate. A third example of the system, optionally including one or more of the previous examples, further includes where instructions further cause the controller to adjust a position of an EGR valve to a more open position responsive to the monitored engine parameter, wherein the EGR valve is coupled between the donor cylinder and an exhaust passage. A fourth example of the system, optionally including one or more of the previous examples, further includes where the first fuel is a carbon-free fuel and the second fuel is a carbon-containing fuel.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose several embodiments of the inventive subject matter, including the best mode, and to enable one of ordinary skill in the art to practice the embodiments of inventive subject matter, including making and using the devices or systems and performing the incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method for an engine, comprising:
adjusting only a first substitution rate of a first fuel, a second fuel, and an oxidant delivered to at least one donor cylinder of the engine and maintaining a second substitution rate of the first fuel, the second fuel, and the oxidant delivered to at least one non-donor cylinder in response to a monitored engine parameter,
wherein the adjusted first substitution rate and the maintained second substitution rate are different from each other,
wherein the first fuel is carbon-free, and
wherein the monitored engine parameter is a status of an aftertreatment device, wherein the status of the aftertreatment device comprises temperature, flow, pressure drop across the aftertreatment device, whether the aftertreatment device is regenerating, an anticipated regeneration start event, and estimated collection of flammable substances in the aftertreatment device.

2. The method of claim 1, wherein the monitored engine parameter is an ambient temperature.

3. The method of claim 2, wherein the first substitution rate is greater than the second substitution rate.

4. The method of claim 1, wherein the first substitution rate is less than the second substitution rate.

5. The method of claim 1, wherein adjusting the first substitution rate comprises decreasing an amount of the first fuel and increasing an amount of the second fuel.

6. The method of claim 1, wherein the first fuel has a lower carbon content than the second fuel.

7. The method of claim 1, wherein the monitored engine parameter is an engine load or an engine speed.

8. The method of claim 1, further comprising flowing exhaust gases from the at least one donor cylinder to the at least one non-donor cylinder.

9. A system, comprising:
an exhaust gas recirculation system (EGR) comprising an exhaust channel extending from a donor cylinder to an intake manifold for recirculating an exhaust emission to the donor cylinder and a non-donor cylinder; and
a controller with instructions stored on memory thereof that cause the controller to:
in response to a steady-state operation ending, decrease a first substitution rate of a first fuel and a second fuel in the donor cylinder and maintaining a second substitution rate of the first fuel and the second fuel in the non-donor cylinder,
wherein the decreased first substitution rate and the maintained second substitution rate are different from each other,
wherein the first fuel is carbon-free, and
wherein the monitored engine parameter is a status of an aftertreatment device, wherein the status of the aftertreatment device comprises temperature, flow, pressure drop across the aftertreatment device, whether the aftertreatment device is regenerating, an anticipated regeneration start event, and estimated collection of flammable substances in the aftertreatment device.

10. The system of claim 9, wherein the instructions further cause the controller to adjust a position of an EGR valve coupled between the donor cylinder and an exhaust passage.

11. The system of claim 9, wherein the donor cylinder is one of a plurality of donor cylinders, and wherein the instructions cause the controller to decrease the first substitution rate of each of the plurality of donor cylinders.

12. The system of claim 9, wherein the donor cylinder is one of a plurality of donor cylinders, and wherein the instructions cause the controller to maintain the second substitution rate of the other donor cylinders of the plurality of donor cylinders.

13. The system of claim 9, wherein the first fuel and the second fuel are selected from a plurality of fuels including one or more of gasoline, diesel, hydrogenation-derived renewable diesel (HDRD), alcohol(s), ethers, ammonia, biodiesels, hydrogen, natural gas, kerosene, syn-gas, and a cryogenic liquid.

14. A system for a vehicle, comprising:
an engine comprising a donor cylinder and a non-donor cylinder;
an exhaust gas recirculation system (EGR) comprising an exhaust channel extending from the donor cylinder to an intake manifold; and
a controller with instructions stored on memory that cause the controller to:
operate the donor cylinder and the non-donor cylinder at a given substitution rate including a first fuel, a second fuel, and an oxidant; and
operate the non-donor cylinder at the given substitution rate and the donor cylinder at a different substitution rate in response to a monitored engine parameter,
wherein the first fuel is carbon-free, and
wherein the monitored engine parameter is a status of an aftertreatment device, wherein the status of the aftertreatment device comprises temperature, flow, pressure drop across the aftertreatment device, whether the aftertreatment device is regenerating, an anticipated regeneration start event, and estimated collection of flammable substances in the aftertreatment device.

15. The system of the vehicle of claim 14, wherein the monitored engine parameter is a transient acceleration, and wherein the different substitution rate is less than the given substitution rate.

16. The system of the vehicle of claim 14, wherein the monitored engine parameter is a low load or an ambient temperature, and wherein the different substitution rate is greater than the given substitution rate.

17. The system of the vehicle of claim 14, wherein instructions further cause the controller to adjust a position of an EGR valve to a more open position responsive to the monitored engine parameter, wherein the EGR valve is coupled between the donor cylinder and an exhaust passage.

18. The system of the vehicle of claim 14, wherein the second fuel is a carbon-containing fuel.

* * * * *